US010401608B2

(12) United States Patent
Nakatsuka

(10) Patent No.: US 10,401,608 B2
(45) Date of Patent: Sep. 3, 2019

(54) IMAGE ACQUISITION APPARATUS

(71) Applicant: OLYMPUS CORPORATION, Tokyo (JP)

(72) Inventor: Masayuki Nakatsuka, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 194 days.

(21) Appl. No.: 15/593,856

(22) Filed: May 12, 2017

(65) Prior Publication Data
US 2017/0336617 A1    Nov. 23, 2017

(30) Foreign Application Priority Data

May 19, 2016  (JP) .................................. 2016-100308

(51) Int. Cl.
*G02B 21/02*  (2006.01)
*G02B 21/36*  (2006.01)
(Continued)

(52) U.S. Cl.
CPC .......... *G02B 21/365* (2013.01); *G02B 21/02* (2013.01); *G02B 21/26* (2013.01); *G02B 21/361* (2013.01);
(Continued)

(58) Field of Classification Search
CPC .......... H04N 9/646; H04N 9/643; H04N 9/07; H04N 1/3876; G02B 21/361; G02B 21/26;
(Continued)

(56) References Cited

U.S. PATENT DOCUMENTS 5,757,298 A *  5/1998  Manley .................... G09G 5/02
                                                                 341/118
6,040,876 A *  3/2000  Pettitt .................... H04N 9/643
                                                                 348/574
(Continued)

FOREIGN PATENT DOCUMENTS

EP    2 413 130 A1    2/2012
JP    H11-95125 A    4/1999
(Continued)

OTHER PUBLICATIONS

Yingen, X. et al., "Color Correction for Mobile Panorama Imaging", Proceedings of the First International Conference on Internet Multimedia Computing and Service, New York, N.Y., Jan. 1, 2009, pp. 219-226.
(Continued)

*Primary Examiner* — Neil R Mikeska
(74) *Attorney, Agent, or Firm* — Scully, Scott, Murphy & Presser, P.C.

(57) ABSTRACT

An image acquisition apparatus including: a stage on which a specimen is mounted; an objective lens that collects light from the specimen; a stage driving part that drives the stage; an image capturing unit that acquires an image by photographing the light collected by the objective lens; an image-generating unit that generates a pasted image by pasting the captured image acquired by the image capturing unit; a storage unit that stores the pasted image; a color-difference calculating unit that calculates a degree of dissimilarity between a color of the pasted image and a color of the captured image prior to pasting; and a color-difference correcting unit that corrects the color of the captured image so as to match the color of the pasted image, on the basis of the calculated degree of dissimilarity.

8 Claims, 2 Drawing Sheets

(51) Int. Cl.
*G02B 21/26* (2006.01)
*G06T 11/00* (2006.01)
*H04N 9/07* (2006.01)
*H04N 9/64* (2006.01)
*H04N 1/387* (2006.01)
*G06T 7/90* (2017.01)
*H04N 9/73* (2006.01)

(52) U.S. Cl.
CPC .......... *G02B 21/367* (2013.01); *G06T 11/001* (2013.01); *H04N 1/3876* (2013.01); *H04N 9/07* (2013.01); *H04N 9/643* (2013.01); *H04N 9/646* (2013.01); *G06T 7/90* (2017.01); *G06T 2207/10024* (2013.01); *H04N 9/735* (2013.01)

(58) Field of Classification Search
CPC .... G02B 21/02; G02B 21/367; G02B 21/365; G06T 11/001
See application file for complete search history.

(56) References Cited

U.S. PATENT DOCUMENTS

| | | | | |
|---|---|---|---|---|
| 6,097,502 | A * | 8/2000 | Shu | H04N 1/4057 358/1.9 |
| 6,115,726 | A * | 9/2000 | Ignjatovic | G06F 17/10 708/300 |
| 6,128,108 | A * | 10/2000 | Teo | G06T 3/0081 358/1.9 |
| 6,813,040 | B1 * | 11/2004 | Uchino | H04N 1/2158 358/1.9 |
| 7,027,628 | B1 | 4/2006 | Gagnon et al. | |
| 7,305,109 | B1 | 12/2007 | Gagnon et al. | |
| 2004/0051905 | A1 * | 3/2004 | Yamada | H04N 1/52 358/3.03 |
| 2008/0284793 | A1 * | 11/2008 | Young | G09G 5/02 345/604 |
| 2012/0002043 | A1 * | 1/2012 | Nitta | G01N 1/06 348/135 |
| 2012/0050727 | A1 * | 3/2012 | Yamamoto | G01J 3/0208 356/218 |
| 2012/0069171 | A1 * | 3/2012 | Kodaira | G02B 21/365 348/79 |
| 2012/0075455 | A1 * | 3/2012 | Hiraide | G02B 21/247 348/79 |
| 2015/0241686 | A1 | 8/2015 | Abe | |

FOREIGN PATENT DOCUMENTS

| | | |
|---|---|---|
| JP | 2010-230495 A | 10/2010 |
| JP | 2014-115609 A | 6/2014 |
| WO | 2010/109811 A1 | 9/2010 |

OTHER PUBLICATIONS

Tian, G.Y. et al., "Colour Correction for Mobile Panorama Imaging", Proceedings of the Sixth International Conference on Information Visualization, IV'02, Jan. 1, 2002, pp. 483-488.

Extended European Search Report dated Oct. 2, 2017 in European Patent Application No. 17 16 8581.1.

Tian, G.Y. et al., *"Colour Correction for Panoramic Imaging"*. Proceedings of the Sixth International Conference on Information Visualization, IV'02, Jan. 1, 2002, pp. 483-488.

* cited by examiner

IMAGE ACQUISITION APPARATUS

CROSS-REFERENCE TO RELATED APPLICATIONS

This application is based on Japanese Patent Application No. 2016-100308 filed on May 19, 2016, the content of which is incorporated herein by reference.

TECHNICAL FIELD

The present invention relates to an image acquisition apparatus.

BACKGROUND ART

In the related art, there is a known microscope that photographs a specimen while moving the observation viewing field by moving a stage on which the specimen is mounted and that generates a wide-field-angle image by sequentially pasting the acquired images (for example, see PTL 1).

In the case where images are pasted as explained in PTL 1, the brightness and hue in each image change due to the AE (Auto Exposure), AGC (Auto Gain Control), or AWB (Auto White Balance) operations in the camera.

To overcome this situation, a system that stops the AGC operation has been disclosed (for example, see PTL 2).

CITATION LIST

Patent Literature

{PTL 1}
Japanese Unexamined Patent Application, Publication No. 2014-115609
{PTL 2}
Japanese Unexamined Patent Application, Publication No. H11-95125

SUMMARY OF INVENTION

One aspect of the present invention provides an image acquisition apparatus comprising: a stage on which a specimen is to be mounted; an objective lens that collects light from the specimen mounted on the stage; a stage driving part that drives the stage in a direction intersecting an optical axis of the objective lens; an image capturing unit that acquires an image by photographing the light collected by the objective lens; an image-generating unit that generates a pasted image by pasting the captured image acquired by the image capturing unit; a storage unit that stores the pasted image generated by the image-generating unit; a color-difference calculating unit that calculates a degree of dissimilarity between a color of the pasted image and a color of the captured image prior to pasting, by the image-generating unit, of the pasted image stored in the storage unit and the captured image; and a color-difference correcting unit that corrects the color of the captured image so as to match the color of the pasted image, on the basis of the degree of dissimilarity calculated by the color-difference calculating unit.

DESCRIPTION OF EMBODIMENTS

An image acquisition apparatus according to an embodiment of the present invention will be described below with reference to the drawings.

Figure 1:
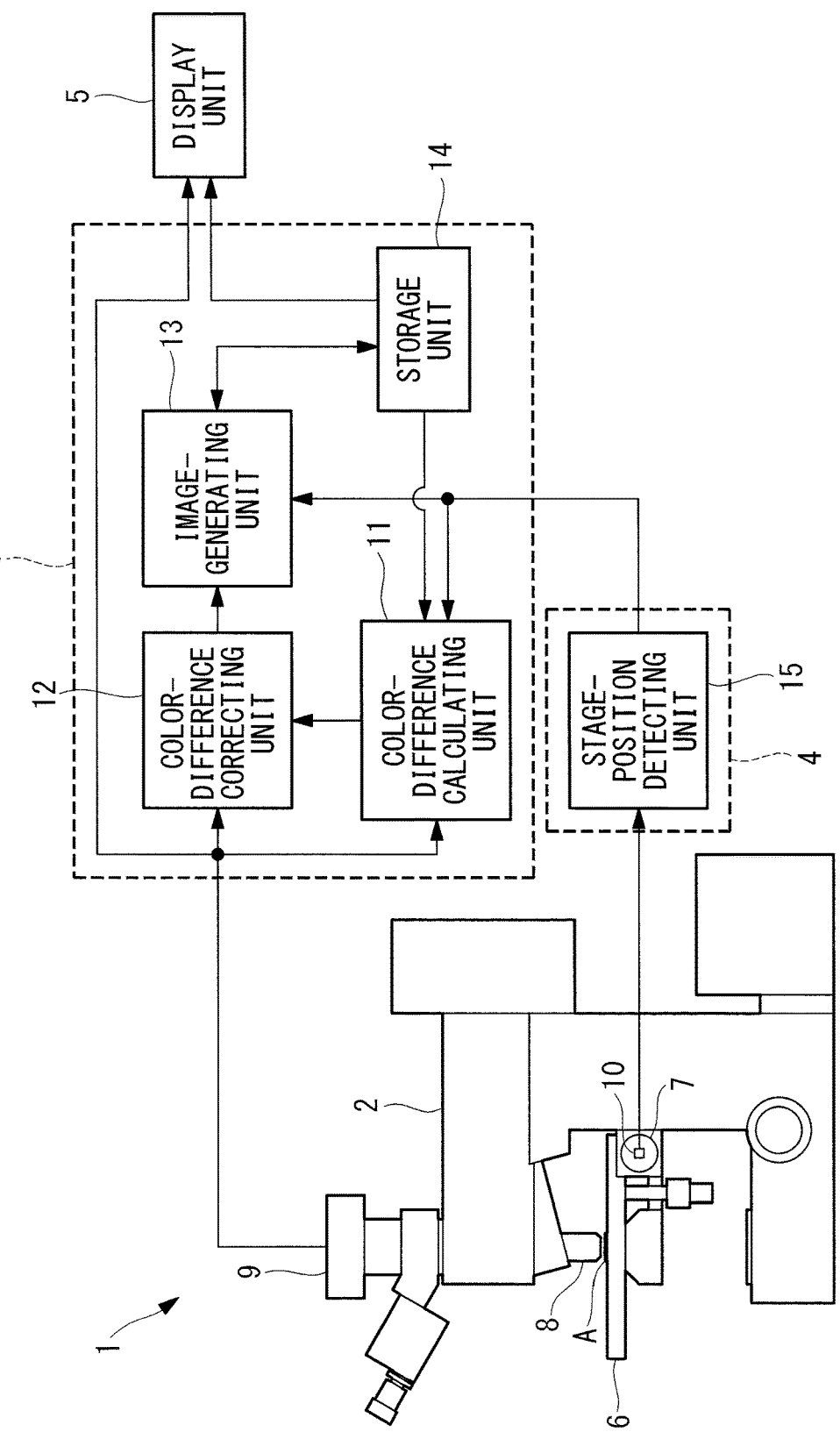
FIG. 1 is a diagram showing an overall configuration of an image acquisition apparatus according to an embodiment of the present invention.

As shown in FIG. 1, the image acquisition apparatus according to this embodiment, which is a microscope apparatus, includes a microscope body 2, a computational unit 3, a microscope interface unit 4, and a display unit 5.

The microscope body 2 includes a stage 6 on which a specimen A is mounted, a motor 7 (stage driving part) 7 that moves the stage 6 in directions in three dimensions, an objective lens 8 that is provided vertically above the specimen A mounted on the stage 6, and an image capturing unit 9 that photographs the light from the specimen A, which is collected by the objective lens 8. The motor 7 includes an encoder 10 that detect the position of the stage 6.

In addition to photographing and acquiring a live image and a still image, in order to observe the specimen A with a brightness appropriate for the specimen A (corrected exposure), the image capturing unit 9 has an AE function for automatically controlling the exposure time or an AGC function for automatically controlling the gain, so that an image can be acquired with suitable brightness according to the specimen A. In addition, the image capturing unit 9 also has an AWB function that suitably corrects the hue of the image so that the background becomes colorless.

The image capturing unit 9 is, for example, a camera using an image capturing element such as a CCD or CMOS device that can obtain a color (RGB) image.

The image information obtained by the image capturing unit 9 is sent to the computational unit 3.

The computational unit 3 is a computing device using, for example, a general-purpose personal computer, a workstation, an embedded processor, or an FPGA (Field Programmable Gate Array). The computational unit 3 includes a color-difference calculating unit 11, a color-difference correcting unit 12, an image-generating unit 13 that generates a pasted image M, and a storage unit 14 that stores the generated pasted image M.

Figure 2:
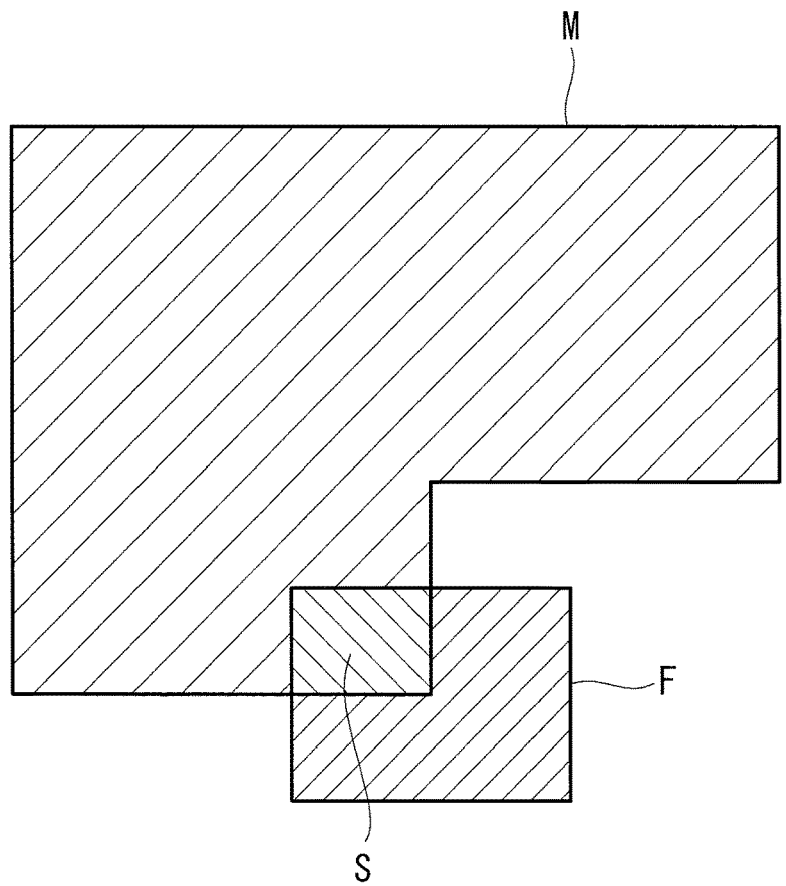
FIG. 2 is a diagram for explaining pasting processing of a pasted image and a frame image, performed by the image acquisition apparatus in FIG. 1.

As shown in FIG. 2, the color-difference calculating unit 11 calculates the degree of dissimilarity in color (brightness and hue) between each frame image (captured image) F in a live image input from the image capturing unit 9 and a shared region S in common with the pasted image M stored in the storage unit 14, in other words, the color-difference calculating unit 11 calculates a color difference. The position of the frame image F on the pasted image M is determined by using stage position information output from a stage-position detecting portion 15, which is described later.

The color-difference correcting unit 12 corrects the brightness and hue of each frame image F in the live image input from the image capturing unit 9 by using the degree of dissimilarity calculated in the color-difference calculating unit 11 so as to match the brightness and hue of the pasted image M stored in the storage unit 14.

For each of the frame images F in the live image which are corrected in the color-difference correcting unit 12, the image-generating unit 13 generates a new pasted image M by pasting the frame image F on the pasted image M stored in the storage unit 14, on the basis of the stage position information output from the stage-position detecting portion 15, and stores the new pasted image M in the storage unit 14.

The storage unit 14 may be an HDD, an SSD, or the like.

The microscope interface unit 4 includes the stage-position detecting unit 15, which detects the position of the stage 6, from the detected information detected by the encoder 10 provided in the motor 7. The detected position information of the stage 6 is sent to the image-generating unit 13 in the computational unit 3.

The display unit 5 is, for example, a liquid crystal display that displays the live image obtained by the image capturing unit 9 and the pasted image M stored in the storage unit 14.

The processing in the color-difference calculating unit 11 and the color-difference correcting unit 12 are described in detail below with reference to FIG. 2.

The color-difference calculating unit 11 calculates the degree of dissimilarity in the shared region S between the pasted image M stored in the storage unit 14 and the frame image F obtained by the image capturing unit 9 using Equation (1) below.

$$\Delta R=\Sigma(Mr(x,y)-Fr(x,y))/N$$

$$\Delta G=\Sigma(Mg(x,y)-Fg(x,y))/N$$

$$\Delta B=\Sigma(Mb(x,y)-Fb(x,y))/N \quad (1)$$

Here, $\Delta R$ is the degree of dissimilarity for red, $\Delta G$ is the degree of dissimilarity for green, and $\Delta B$ is the degree of dissimilarity for blue; $Mr(x,y)$ is the red pixel value in the pasted image M at position (x,y) in the shared region S; $Fr(x,y)$ is the red pixel value in the frame image F at position (x,y) in the shared region S; $Mg(x,y)$ is the green pixel value in the pasted image M at position (x,y) in the shared region S; $Fg(x,y)$ is the green pixel value in the frame image F at position (x,y) in the shared region S; $Mb(x,y)$ is the blue pixel value in the pasted image M at position (x,y) in the shared region S; $Fb(x,y)$ is the blue pixel value in the frame image F at position (x,y) in the shared region S; and N is the number of pixels in the shared region S.

The color-difference correcting unit 12 corrects the overall brightness and hue of the frame image F according to Equation (2) below, using the degrees of dissimilarity $\Delta R$, $\Delta G$, and $\Delta B$ calculated in the color-difference calculating unit 11.

$$F'r(x,y)=Fr(x,y)+\Delta R$$

$$F'g(x,y)=Fg(x,y)+\Delta G$$

$$F'b(x,y)=Fb(x,y)+\Delta B \quad (2)$$

Here, $F'r(x,y)$ is the corrected red pixel value in the frame image F at position (x,y), $F'g(x,y)$ is the corrected green pixel value in the frame image F at position (x,y), and $F'b(x,y)$ is the corrected blue pixel value in the frame image F at position (x,y).

Thus, with the image acquisition apparatus according to this embodiment, the frame image F corrected on the basis of the degrees of dissimilarity $\Delta R$, $\Delta G$, and $\Delta B$ are corrected so that the brightness and hue match the pasted image M, and therefore, an advantage is afforded in that it is possible to prevent the occurrence of unnatural joins due to differences in brightness and hue at the position where the frame image F and the pasted image M stored in the storage unit 14 are pasted.

In this embodiment, although the degrees of dissimilarity $\Delta R$, $\Delta G$, and $\Delta B$ are calculated using RGB values, instead of these, degrees of dissimilarity in other color spaces, such as L*a*b*, L*u*v*, or HSV may be calculated and corrected.

In Equation (1) and Equation (2), the degrees of dissimilarity $\Delta R$, $\Delta G$, and $\Delta B$ are calculated separately, and the pixel values are corrected by individually adding those degrees of dissimilarity $\Delta R$, $\Delta G$, and $\Delta B$ to the pixel values in the frame image F; instead of this, however, the degrees of dissimilarity may be calculated using a ratio, and the pixel values may be corrected by multiplying the pixel values in the frame image F by this ratio.

In addition, in this embodiment, the color-difference calculating unit 11 calculates the degrees of dissimilarity $\Delta R$, $\Delta G$, and $\Delta B$ using simple averages of the pixel values in the shared region S; instead of this, however, they may be calculated using Equation (3) below.

$$\Delta R=\Sigma(w(x,y)\cdot(Mr(x,y)-Fr(x,y)))/N\Sigma w(x,y)$$

$$\Delta G=\Sigma(w(x,y)\cdot(Mg(x,y)-Fg(x,y)))/N\Sigma w(x,y)$$

$$\Delta B=\Sigma(w(x,y)\cdot(Mb(x,y)-Fb(x,y)))/N\Sigma w(x,y) \quad (3)$$

Here, $w(x,y)$ is a weight at the coordinate position (x,y) in the shared region S, and can be calculated by Equation (4) below.

$$w(x,y)=r_{max}-r \quad (4)$$

Figure 3:
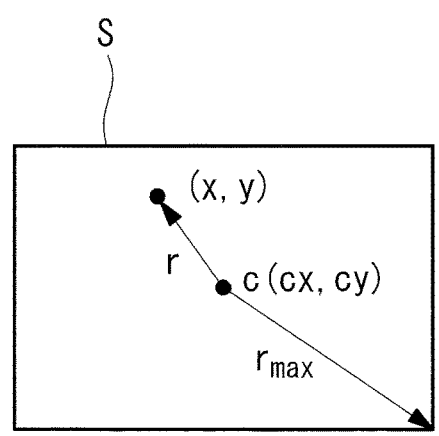
FIG. 3 is a diagram showing a shared region between the pasted image and the frame image shown in FIG. 2.

Here, as shown in FIG. 3, $r_{max}$ is the Euclidean distance from the center point c (cx,cy) in the shared region S to the most-distant part of the shared region S, and in the example shown in FIG. 3, is half of the diagonal length of the shared region S, which is formed of a rectangle.

In addition, r is the Euclidean distance from the center point c (cx, cy) to arbitrary coordinates, and is represented by Equation (5) below:

$$r=\sqrt{((x-cx)^2+(y-cy)^2)} \quad (5)$$

In this embodiment, an example in which the weight $w(x,y)$ is calculated using the Euclidean distance has been used; however, instead of this, the Manhattan distance (urban distance) or the like may be used.

In general, a decrease in the peripheral light level occurs in the image obtained by the image capturing unit 9 due to vignetting, the $\cos^4$ rule, etc. By calculating $\Delta R$, $\Delta G$, and $\Delta B$ with Equation (3) above, it is possible to reduce the calculation error of the degrees of dissimilarity $\Delta R$, $\Delta G$, and $\Delta B$ caused by the reduction in peripheral light level, and an advantage is afforded in that the degrees of dissimilarity $\Delta R$, $\Delta G$, and, $\Delta B$ can be calculated with good precision, and the brightness and hue of the frame image F can be corrected with good precision.

In addition, image information is generally integer values, and the degrees of dissimilarity $\Delta R$, $\Delta G$, and $\Delta B$ calculated by Equation (1) or Equation (3) are rounded to integer values using Equation (6) below.

$$\Delta R'=\text{Round}(\Delta R)$$

$$\Delta G'=\text{Round}(\Delta G)$$

$$\Delta B'=\text{Round}(\Delta B) \quad (6)$$

Here, $\Delta R'$, $\Delta G'$, and $\Delta B'$ are the rounded degrees of dissimilarity.

Then, the color-difference calculating unit 11 calculates the rounding error using Equation (7) below.

$$Er=\Delta R-\Delta R'$$

$$Eg=\Delta G-\Delta G'$$

$$Eb=\Delta B-\Delta B' \quad (7)$$

Here, Er, Eg, and Eb are the rounding errors.

Then, the degrees of dissimilarity ΔR, ΔG, and ΔB may be calculated in the color-difference calculating unit 11 using Equation (8).

$$\Delta R = \Sigma(Mr(x,y) - Fr(x,y))/N + Er$$

$$\Delta G = \Sigma(Mg(x,y) - Fg(x,y))/N + Eg$$

$$\Delta B = \Sigma(Mb(x,y) - Fb(x,y))/N + Eb \quad (8)$$

Each time the degrees of dissimilarity ΔR, ΔG, and ΔB are calculated and brightness and hue correction is performed on each frame image F, by adding the rounding errors Er, Eg, and Eb, it is possible to prevent the rounding errors Er, Eg, and Eb from accumulating on the calculated degrees of dissimilarity ΔR, ΔG, and ΔB, the frame image F can be corrected with good precision, and it is possible to prevent the generation of a pasted image M having unnatural joins.

One aspect of the present invention, which includes the aforementioned embodiments, provides an image acquisition apparatus comprising: a stage on which a specimen is to be mounted; an objective lens that collects light from the specimen mounted on the stage; a stage driving part that drives the stage in a direction intersecting an optical axis of the objective lens; an image capturing unit that acquires an image by photographing the light collected by the objective lens; an image-generating unit that generates a pasted image by pasting the captured image acquired by the image capturing unit; a storage unit that stores the pasted image generated by the image-generating unit; a color-difference calculating unit that calculates a degree of dissimilarity between a color of the pasted image and a color of the captured image prior to pasting, by the image-generating unit, of the pasted image stored in the storage unit and the captured image; and a color-difference correcting unit that corrects the color of the captured image so as to match the color of the pasted image, on the basis of the degree of dissimilarity calculated by the color-difference calculating unit.

According to this aspect, the specimen is mounted on the stage, and while the stage driving part is operated to move the specimen in a direction intersecting the optical axis of the objective lens, when an image is acquired at each position by the image capturing unit, the degree of dissimilarity between the color of the captured image which is acquired and the color of the pasted image stored in the storage unit is calculated in the color-difference calculating unit, and after the color of the captured image is corrected by the color-difference correcting unit on the basis of the calculated degree of dissimilarity, pasting of the pasted image stored in the storage unit and the captured image is performed by the image generating unit.

In the color-difference correcting unit, the color of the captured image is corrected so as to match the color of the pasted image stored in the storage unit, and therefore, it is possible to generate a high-quality pasted image, reducing unnatural joins due to changes in brightness or hue.

In the above-described aspect, for a shared region between the pasted image stored in the storage unit and the captured image, the color-difference calculating unit may calculate the degree of dissimilarity using a weight that becomes smaller as distance from the center of the shared region becomes greater.

By doing so, in the calculation of the degree of dissimilarity by the color-difference calculating unit, by using a weight that becomes smaller as the distance from the center of the shared region becomes greater, it is possible to reduce the influence of a reduction in light level at a peripheral region, making it possible to calculate the degree of dissimilarity with good precision.

In the above-described aspect, each time the degree of dissimilarity is calculated, the color-difference calculating unit may cumulatively add and store a rounding error generated in the calculation, and when the degree of dissimilarity is calculated, the cumulatively added value of the rounding error of a previous calculation, which is stored, may be added.

By doing so, it is possible to correct the rounding error that accumulates when calculating the degree of dissimilarity, and it is possible to calculate the degree of dissimilarity with good precision.

The aforementioned aspects afford an advantageous effect that it can generate, in a short time, a pasted image that has reduced unnatural joins.

REFERENCE SIGNS LIST 1 image acquisition apparatus
6 stage
7 motor (stage driving part)
8 objective lens
9 image capturing unit
11 color-difference calculating unit
12 color-difference correcting unit
13 image-generating unit
14 storage unit
A specimen

The invention claimed is:

1. An image acquisition apparatus comprising:
a stage on which a specimen is mounted;
an objective lens that collects light from the specimen mounted on the stage;
an actuator that drives the stage in a direction intersecting an optical axis of the objective lens;
an image sensor that acquires an image by photographing the light collected by the objective lens; and
a processor comprising hardware, the processor being configured to:
generate a pasted image by pasting the acquired image;
store the pasted image in a memory;
calculate a degree of dissimilarity between a color of the pasted image and a color of the acquired image in a region which is shared by the pasted image and the acquired image prior to pasting of the pasted image stored in the memory and the acquired image; and
correct the color of an entire area of the acquired image so as to match the color of the pasted image, on the basis of the calculated degree of dissimilarity.

2. The image acquisition apparatus according to claim 1, wherein, for a shared region between the pasted image stored in the memory and the acquired image, processor calculates the degree of dissimilarity using a weight that becomes smaller as distance from the center of the shared region becomes greater.

3. The image acquisition apparatus according to claim 1, wherein, each time the degree of dissimilarity is calculated, the processor cumulatively adds and stores a rounding error generated in the calculation, and when the degree of dissimilarity is calculated, the cumulatively added value of the rounding error of a previous calculation, which is stored, is added.

4. An image acquisition apparatus comprising:
a stage on which a specimen is mounted;

an objective lens that collects light from the specimen mounted on the stage;

an actuator that drives the stage in a direction intersecting an optical axis of the objective lens;

an image sensor that acquires an image by photographing the light collected by the objective lens;

a memory in which a pasted image is stored; and a processor comprising hardware, the processor being configured to:

calculate a degree of dissimilarity between a color of the pasted image stored in the memory and a color of the acquired image in a region which is shared by the pasted image and the acquired image;

correct the color of an entire area of the acquired image on the basis of the calculated degree of dissimilarity; and generate a new pasted image by pasting the corrected acquired image on the pasted image and storing a new pasted image in the memory.

5. The image acquisition apparatus according to claim 4, wherein, for a shared region between the pasted image stored in the memory and the acquired image, the processor calculates the degree of dissimilarity using a weight that becomes smaller as distance from the center of the shared region becomes greater.

6. The image acquisition apparatus according to claim 4, wherein, each time the degree of dissimilarity is calculated, the processor cumulatively adds and stores a rounding error generated in the calculation, and adds the stored cumulatively added value of the rounding error of a previous calculation in order to calculate the degree of dissimilarity when the degree of dissimilarity is calculated.

7. The image acquisition apparatus according to claim 1, wherein the processor calculates the degree of dissimilarity as one of a difference or a ratio between a pixel value of each of colors of the pasted image and a pixel value of each of colors of the acquired image in the region which is shared by the pasted image and the acquired image prior to pasting.

8. The image acquisition apparatus according to claim 4, wherein the processor calculates the degree of dissimilarity as one of a difference or a ratio between a pixel value of each of colors of the pasted image stored in the memory and a pixel value of each of colors of the acquired image in the region which is shared by the pasted image and the acquired image.

\* \* \* \* \*